Feb. 11, 1969    A. B. BROERMAN    3,426,940
PRESSURE VESSELS
Filed Nov. 21, 1966

INVENTOR.
A.B. BROERMAN
BY *Young & Quigg*
ATTORNEYS

United States Patent Office 3,426,940
Patented Feb. 11, 1969

3,426,940
PRESSURE VESSELS
Arthur B. Broerman, Bartlesville, Okla., assignor to Phillips Petroleum Company, a corporation of Delaware
Filed Nov. 21, 1966, Ser. No. 595,905
U.S. Cl. 220—83   5 Claims
Int. Cl. B65d 1/42, 11/22

ABSTRACT OF THE DISCLOSURE

A pressure vessel is fabricated by embedding a filament sheet, made of polyimide fibers formed as a polycondensation reaction product of an aromatic tetrabasic acid and an aromatic diamine, into a thermoplastic material such as an olefin polymer. The filament sheet can be, for instance, a layer of knit fabric. The walls of this pressure vessel may be formed by disposing the filament layer between two sheets of heated thermoplastic material and applying pressure against the outer thermoplastic layers to force the thermoplastic material around the filaments. Alternatively, the filament layer can be disposed within a mold and the thermoplastic material introduced into the mold in the form of a parison which is subsequently blown out against the filament layer, thus forcing the thermoplastic material against the fibrous layer so that the fibers are embedded in the thermoplastic material.

---

Figure 1:
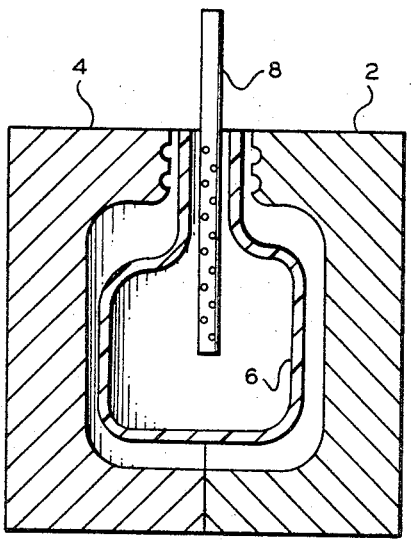

This invention relates to pressure vessels. In one of its aspects it relates to high strength plastic pressure vessels having a substantially enclosed body made of a thermoplastic material, the body having substantially embedded in the walls thereof a fibrous layer of a high temperature resistant organic material.

In another of its aspects the invention relates to a method for producing a high strength pressure vessel comprising molding a thermoplastic body into a suitable mold which contains a continuous fibrous layer of a high temperature resistant organic material in which the individual fibers are so disposed as to be in interlocking relationship.

Rosato, in Plastics World, February 1966, volume 24, pp. 30–35, elucidates the rapid development of reinforced plastics and the acute interest in such composites. As disclosed by Rosato, the available reinforced plastics are made of polyester, epoxy, phenolic or silicone base material with reinforcements made of glass cloth, glass mat, asbestos paper, cotton cloth and nyon cloth. The different composites exhibit different properties. Many of these materials, although possessing high tensile strength, do not possess the requisite ductility for pressure vessels due to the low ductility of the reinforcing and/or base material.

It has been proposed to make pressure vessels out of thermoplastic materials such as polyethylene and the like. These materials have sufficient ductility but possess low strength—especially at elevated temperatures. Many attempts have been made to reinforce thermoplastic materials such as polyethylene with glass fibers. However, the glass fibers are not easily wet by the thermoplastic material and thus little or no bonding occurs between the fiber and the polyolefins whereby inadequate reinforcement results.

Attempts have been made to reinforce thermoplastic materials with other thermoplastic fibers and higher strength materials such as nylon. However, two problems are encountered. The first is that the thermoplastic materials have a low softening point and by attempting to bond the reinforcing material to the base material using higher temperatures, the strength of the fibrous material is lost. The second problem is that nylon, for example, does not bond to thermoplastic materials such as polyethylene and other 1-olefin polymers.

Pressure vessels have been made using poly-1-olefins by wrapping tightly around a formed container a reinforcing material such as wire or other high strength reinforcing material. However, this reinforcing can generally only be done when the pressure vessel is cylindrically shaped and the winding cannot extend over the whole surface of the container since the wire cannot be tightly wrapped around the bottom of the container. Thus, the strength of the bottom of the container limits the pressure rating of the pressure vessel. As well as being impractical, this method is also expensive and cannot favorably compete with high strength metal pressure vessels.

I have now discovered that a relatively high strength pressure vessel can be made from a high temperature fibrous material which is embedded as an interlocked continuous layer in the walls of a thermoplastic body which is molded at a temperature and a pressure sufficient to cause the thermoplastic material to embed or substantially envelop the fibrous material.

By various aspects of this invention, one or more of the following, or other, objects can be obtained.

It is an object of this invention to provide a high strength pressure vessel having a thermoplastic matrix.

It is a further object of this invention to provide a thermoplastic pressure vessel with an organic fibrous material embedded therein and bonded thereto when the strength of the fibrous material is not destroyed by the forming operation.

It is a further object of this invention to provide a method of forming a high strength pressure vessel out of thermoplastic material and a high temperature resistant organic material.

Other aspects, objects, and the several advantages of this invention are apparent to one skilled in the art from a study of this disclosure, the drawings and the appended claims.

According to the invention, a thermoplastic pressure vessel is provided. The thermoplastic pressure vessel has embedded in the walls thereof a high temperature interlocking continuous filament sheet which is advantageously made from a polyimide which results from the polycondensation reaction of an aromatic tetrabasic acid and an aromatic diamine. This high temperature fibrous material can be obtained in filamentary or woven form from E. I. du Pont under the trade name of Nomex. This polyimide material is particularly suited for the invention because it retains a substantial portion of its strength up to about 500° F. and does not melt. The fibrous material can be heated up to 700° F. without any substantial deterioration.

In one embodiment, the fibrous material is coated with a thermoplastic material which will bond to both the polyimide and to the thermoplastic molding material. A suitable coating material is a fluorinated ethylene-propylene copolymer which can be obtained from E. I. du Pont de Nemours & Company under the trade name of FEP Teflon.

The thermoplastic material which is used to form the matrix of the pressure vessel is preferably a high density poly-1-olefin such as polyethylene, polypropylene, polybutene-1 and copolymers thereof. These poly-1-olefins can be produced according to the method described and claimed in U.S. 2,825,721, Hogan and Banks. Other thermoplastic materials which are suitable for the matrix of the pressure vessels according to the invention include polyvinyl chloride and other chlorinated vinyl containing polymers and copolymers; polystyrene and other vinyl aromatic polymers and copolymers.

The filament or fibrous sheet which is embedded in the walls of the container is preferably of such form as to allow stretching to conform to the shape of the molding surface or cavity. Examples of such forms are fish net and knit fabric. The density of the netting is such that the composite structure takes on the strength of the fibers rather than the thermoplastic base material. Preferably the netting or knit fabric will have 1/64 to 1/8" mesh size and the individual filaments of yarn which make up the fabric will have a denier in the range of 50 to 400.

The pressure vessel is advantageously fabricated by inserting a preformed fish net or knitted sock-like sheet of filamentary material into a mold and inserting inside the filamentary layer a thermoplastic layer which is then molded into place under such temperature and pressure that the filamentary sheet or layer will be embedded in the walls of the container, thus mechanically interlocking the filamentary material to the thermoplastic layer. In a preferred embodiment of the invention, the filament sheet or sock is placed over the parison and then expanded so that the filament sheet is fused into the plastic pressure vessel. The operation is carried out at such temperatures and pressure that the high temperature filament layer is embedded in the wall. The molding takes place preferably at the orientation temperature of the thermoplastic material.

In still another embodiment, a pressure vessel of the desired shape is formed, a knit polyimide fabric sock is shaped around the outer surface of the vessel and another thermoplastic layer is heat shrunk onto the outer portion of the thermoplastic—fabric composite under such conditions that the fabric will be mechanically bound to the vessel and the outer surface will be prestressed.

Figure 5:
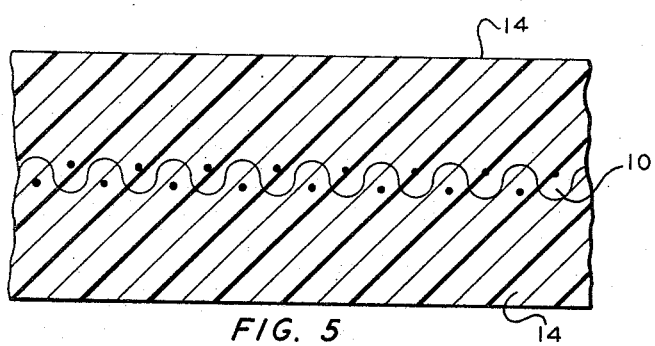

The invention will now be described with reference to the accompanying drawings in which FIGURES 1–4 are schematic representations of different stages of the preferred method according to the invention; and FIGURE 5 is a sectional view through the wall of a pressure vessel according to the invention.

Figure 2:
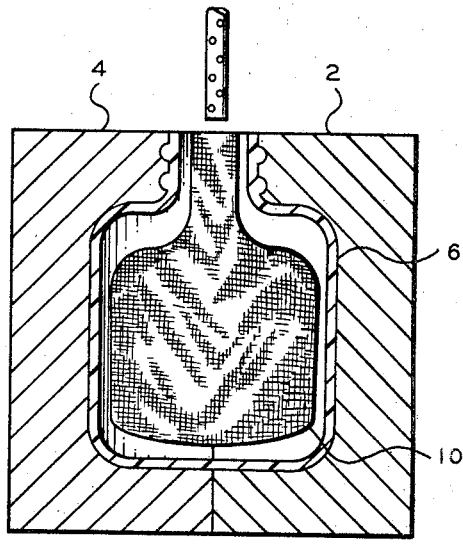
Figure 3:
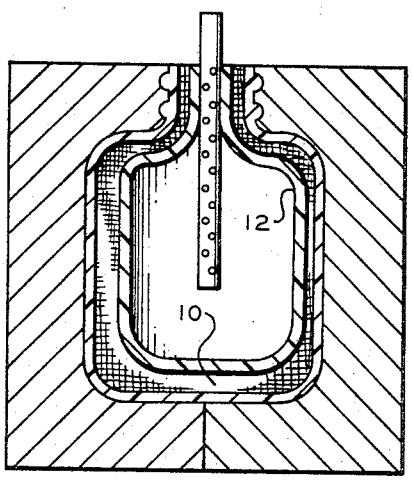
Figure 4:
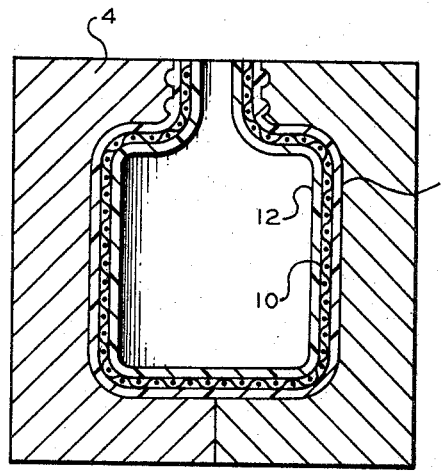

Referring now to FIGURE 1, mold halves 2 and 4 having a mold cavity have positioned within the cavity a thermoplastic parison 6 and a blow molding tube 8. The thermoplastic parison is expanded against the walls of the mold cavity to thereby take the form of the desired pressure vessel. In FIGURE 2 a woven or knitted sock conforming generally to the form of the pressure vessel is placed within the mold cavity after parison 6 has been expanded to conform with the sides of the mold cavity. The sock is advantageously made from a polyimide which is a polycondensation reaction product of an aromatic tetrabasic acid and an aromatic diamine, sold under the trade name of Nomex. A second parison is then inserted into the mold cavity in the inner portion of the knitted layer 10. The second parison is then expanded out against the sides of parison 6 at such temperatures and pressure that the layer 6 will fuse with layer 12 and form a continuous layer with fabric 10 embedded in the center thereof. As is understood by one skilled in the art, heating means (not shown) can be provided in the walls of mold halves 2 and 4 to maintain the molding temperature at the optimum temperature for forming the laminate.

Referring now to FIGURE 5, there is shown a cross section through a pressure vessel constructed according to the invention. A continuous layer 14 has embedded therein a net or knitted layer of fabric made out of polyimide as above disclosed. The fabric is preferably closely knit to provide the maximum support yet open enough to allow the inner wall and outer wall of thermoplastic to enter the openings and join together.

*Example I*

A polypropylene pressure vessel is constructed by blowing a double parison of propylene heated to a molding temperature with a polyimide (Nomex) knitted sock incorporated between the two parisons as outlined above. The sock is shaped during the molding operation to conform to the shape of the mold. The temperature of molding is 400–425° F. and the pressure of molding is 80–100 p.s.i. The dimensions of the pressure vessel are 2" diameter x 6" long and 3/8" in thickness. The Nomex material is a knitted fabric having 1/16" mesh size. Each thread has a denier of 200.

*Example II*

A polyethylene pressure vessel is made in the same fashion as the pressure vessel made in Example I, except that the molding temperature is 375° F. and the molding pressure is 80–100 p.s.i. The type of polyethylene used was Marlex.

*Example III*

A pressure vessel is made by molding a polyethylene parison as Example II except that the first layer of thermoplastic material is not formed and the layer of Nomex is not embedded into the walls of the pressure vessel. The vessel thus formed is 2" diameter x 6" long and 3/16" thick and has a 3/8" diameter opening at one end which opening is reinforced. The pressure vessel has the following properties:

Bursting strength _____ p.s.i__ 300
Tensile strength _____ p.s.i__ 5,000
Impact resistance _____ ft. lbs./in__ 40

*Example IV*

A pressure vessel is made by a conventional blow molding method in which a polyethylene parison of the same size and composition of that of Example II is blown to conform to the shape of the mold used for the pressure vessels of Examples I–III. The thickness of the wall of this pressure vessel is the same as that in Example III. This vessel has the following properties:

Bursting strength _____ p.s.i__ 240
Tensile strength _____ p.s.i__ 400
Impact resistance _____ ft. lbs./in__ 30

While the invention has been described with regard to the use of blow molding, it is obvious that vacuum molding could be employed in substantially the same way. Further, vacuum molding allows more intricate shapes to be molded. With vacuum molding, the pressure vessel could advantageously be made in two or more parts and assembled when desired.

Other types of molding such as injection, extrusion, rotational and/or slush molding could be employed to make the pressure vessels according to the invention.

*Example V*

A knitted sock of Nomex is placed within a closed bottle mold cavity. Polyethylene powder is placed within the sock within the mold cavity. The mold cavity is heated and rotated about 2 axes simultaneously. The polyethylene within the mold cavity melts and forms integrally with the knit sock against the walls of the mold. The composite structure is cooled and the finished product is removed. The bottle has a wall structure consisting of a uniform layer of polyethylene having embedded therein a continuous layer of knitted Nomex.

*Example VI*

A reinforced polyethylene pipe is made by rotating about a horizontal axis a pipe mold having therein a sheet of woven Nomex cloth. The size of the cloth is slightly larger than the inside surface of the mold so that a slight overlapping occurs. As the mold rotates, the cloth is thrown to the outer portion of the mold. Polyethylene is heated to the molten state and placed within the mold whereupon it is thrown to the outer portion of the mold. The polyethylene fuses together with the hot layer substantially embedded within the walls. The pipe so produced has high strength, high ductility and high impact resistance.

The pressure vessels of the invention find use in many commercial objects such as beer kegs, gas cylinders, and small chemical reactors.

An important feature in producing articles according to the invention is that the thermoplastic material forms around the individual fibers of reinforcing material to thereby lock the fibers into the continuous thermoplastic matrix.

What is claimed is:

1. A ductile pressure vessel comprising a substantially enclosed body made from a thermoplastic polymeric material having substantially completely embedded in the walls thereof a continuous fibrous layer composed of polyimide fibers formed as a polycondensation reaction product of an aromatic tetrabasic acid and an aromatic diamine.

2. A pressure vessel according to claim 1 wherein said continuous fibrous layer is a knitted fabric.

3. A pressure vessel according to claim 2 wherein said knitted fabric has $\frac{1}{64}$ to $\frac{1}{8}''$ mesh size and each thread has a denier in the range of 50 to 400.

4. A pressure vessel according to claim 1 wherein said thermoplastic polymeric material is high density polyethylene.

5. A pressure vessel according to claim 1 wherein said thermoplastic polymer material is a poly-1-olefin.

References Cited

UNITED STATES PATENTS

| 2,594,235 | 4/1952 | Taylor. | |
|---|---|---|---|
| 2,744,043 | 5/1956 | Ramberg. | |
| 2,825,721 | 3/1958 | Hogan et al. | 260—88.2 |
| 3,078,007 | 2/1963 | Veres et al. | 220—83 XR |
| 3,113,831 | 12/1963 | Coale | 264—94 XR |
| 3,214,320 | 10/1965 | Lappala et al. | 161—89 |
| 3,305,911 | 2/1967 | Chapman et al. | 66—202 |

THERON E. CONDON, *Primary Examiner.*